US011772050B2

(12) United States Patent
Wang et al.

(10) Patent No.: US 11,772,050 B2
(45) Date of Patent: Oct. 3, 2023

(54) ONLINE CLEANING SYSTEM FOR MICRO-POLLUTED NANOFILTRATION MEMBRANES USING FORWARD OSMOSIS AND PROCESS OF ONLINE CLEANING SYSTEM

(71) Applicant: Shandong Jianzhu University, Jinan (CN)

(72) Inventors: Lin Wang, Jinan (CN); Feiyong Chen, Jinan (CN); Daoji Wu, Jinan (CN); Xiaozhen Lu, Jinan (CN); Qingyan Xia, Jinan (CN); Tianyu Chen, Jinan (CN); Juan Zhang, Jinan (CN); Lu Zhao, Jinan (CN); Zhihao Li, Jinan (CN); Bo Gui, Jinan (CN)

(73) Assignee: Shandong Jianzhu University, Jinan (CN)

( * ) Notice: Subject to any disclaimer, the term of this patent is extended or adjusted under 35 U.S.C. 154(b) by 51 days.

(21) Appl. No.: 17/728,440

(22) Filed: Apr. 25, 2022

(65) Prior Publication Data
US 2022/0339584 A1    Oct. 27, 2022

(30) Foreign Application Priority Data

Apr. 23, 2021 (CN) .......................... 202110443022.5

(51) Int. Cl.
*B01D 65/02* (2006.01)
*B01D 61/02* (2006.01)
(Continued)

(52) U.S. Cl.
CPC .......... *B01D 15/02* (2013.01); *B01D 61/002* (2013.01); *B01D 61/027* (2013.01); *B01D 61/10* (2013.01);
(Continued)

(58) Field of Classification Search
CPC .... B01D 61/002; B01D 61/027; B01D 61/08; B01D 61/10; B01D 61/12; B01D 61/58;
(Continued)

(56) References Cited

FOREIGN PATENT DOCUMENTS

CN          107486018 B  *  12/2019  ........... B01D 61/002

OTHER PUBLICATIONS

CN107486018B—EPO Machine Translation (Year: 2023).*

* cited by examiner

*Primary Examiner* — Patrick Orme
(74) *Attorney, Agent, or Firm* — LeonardPatel PC; Sheetal S. Patel; Michael A. Leonard, II

(57) ABSTRACT

An online cleaning system for micro-polluted nanofiltration membranes uses forward osmosis, and a process of the online cleaning system, and relates to the field of water treatment membrane separation technique. The online cleaning system includes a nanofiltration raw water tank, a nanofiltration membrane assembly, a pure water tank, a forward osmosis feed solution tank, a forward osmosis draw solution tank, a first saline water tank, a second saline water tank and a water bath temperature control device. Some embodiments include cleaning of the nanofiltration membranes that is realized by using forward osmosis as a nanofiltration membrane cleaning system, and cyclic regeneration of the nanofiltration membranes can be realized, so that the purposes of removing dissolved organic matters in micro-polluted raw water, reducing hardness of calcium and magnesium and prolonging the service life can be achieved.

10 Claims, 1 Drawing Sheet

(51) Int. Cl.
*B01D 61/10* (2006.01)
*B01D 61/12* (2006.01)
*C02F 1/44* (2023.01)
*B01D 15/02* (2006.01)
*B01D 61/00* (2006.01)
*C02F 103/08* (2006.01)

(52) U.S. Cl.
CPC .............. *B01D 61/12* (2013.01); *C02F 1/442* (2013.01); *B01D 2321/04* (2013.01); *B01D 2321/06* (2013.01); *B01D 2321/40* (2013.01); *C02F 2103/08* (2013.01); *C02F 2201/005* (2013.01); *C02F 2209/005* (2013.01); *C02F 2209/02* (2013.01); *C02F 2209/03* (2013.01); *C02F 2209/05* (2013.01); *C02F 2209/40* (2013.01); *C02F 2209/44* (2013.01); *C02F 2303/16* (2013.01)

(58) Field of Classification Search
CPC  B01D 65/02; B01D 2311/04; B01D 2311/12; B01D 2321/04; B01D 2321/06; B01D 2321/40; C02F 1/442; C02F 1/445; C02F 2103/08; C02F 2201/005; C02F 2209/005; C02F 2209/02; C02F 2209/03; C02F 2209/05; C02F 2209/40; C02F 2209/44; C02F 2303/16
See application file for complete search history.

ONLINE CLEANING SYSTEM FOR MICRO-POLLUTED NANOFILTRATION MEMBRANES USING FORWARD OSMOSIS AND PROCESS OF ONLINE CLEANING SYSTEM

CROSS REFERENCE TO RELATED APPLICATION

This patent application claims the benefit and priority of Chinese Patent Application No. 202110443022.5, filed on Apr. 23, 2021, the disclosure of which is incorporated by reference herein in its entirety as part of the present application.

TECHNICAL FIELD

The present disclosure relates to the field of water treatment membrane separation technique, and specifically relates to an online cleaning system for micro-polluted nanofiltration membranes using forward osmosis and a process of the online cleaning system.

BACKGROUND ART

In recent years, the water environment is continuously improved along with the continuous, stable and orderly promotion of environmental governance in China, but the surface water pollution is still very serious, especially the micro-polluted surface water. The micro-polluted surface water is polluted by organic matters, part of water quality indexes exceed the III-type water body standard of "Environmental Quality Standard of Surface Water", and mainly the water quality indexes such as $COD_{Mn}$, $NH_3$—N, COD, BOD and volatile phenol exceed the standard. The conventional drinking water treatment technology is low in removal efficiency of foulants in micro-polluted surface water, so that the effluent water quality is difficult to meet new national drinking water quality standards, and the drinking water safety of people cannot be guaranteed.

In the research and development process of the water treatment technology, the membrane technology is called as the promising water treatment technology, and is widely popularized and applied in the field of water treatment at present. Common membrane separation technologies in water treatment comprise pressure-driven membrane (microfiltration, ultrafiltration, nanofiltration and reverse osmosis), electrodialysis, membrane distillation and liquid membrane technologies. The molecular weight cut-off of the nanofiltration membrane is between ultrafiltration and reverse osmosis, and the surface of the nanofiltration membrane is charged, so that the nanofiltration membrane has a screening effect and a Donnan effect at the same time in the filtration process. Due to the unique filtration principle, the nanofiltration technology is widely applied to the processes of drinking water advanced treatment, industrial water concentration and separation and the like.

However, an existing nanofiltration technology is large in electric energy consumption, low in membrane flux and large in membrane equipment investment. Irreversible membrane fouling, especially membrane pore blockage pollution, caused by dissolved organic matters often occurred while the nanofiltration membrane can be used for efficiently removing organic foulants, and finally the product water quantity and quality of the nanofiltration technology are affected. In order to solve the problem of the membrane fouling and prolong the service life of the membrane, the membrane must be cleaned. The cleaning modes of the membrane comprise physical cleaning and chemical cleaning. Physical cleaning comprises forward and reverse hydraulic flushing, negative pressure, gas washing and the like, foulants are removed from or moved from the surface of the membrane by adopting mechanical treatment means. However, the cleaning methods are relatively complex in equipment design and operation control, and backwashing is relatively difficult to implement for high-pressure membranes such as nanofiltration membranes. For severely polluted membranes, the membrane flux is difficult to recover completely only by physical cleaning, and chemical cleaning is necessary. Commonly used chemical cleaning reagents comprise bases, acids, metal chelating agents, surfactants, oxidants, enzymes, salts and the like. The chemical cleaning agent eliminates membrane fouling by changing the structural form of foulants or the chemical property of the surface of the fouling layer, and the cleaning efficiency is influenced by operating conditions such as temperature, pH value, concentration of the chemical cleaning agent and contact time between the chemical solution and the membrane, so that chemical cleaning is limited greatly.

The novel nanofiltration membrane cleaning method for removing dissolved micro-pollutants is researched, the membrane fouling can be effectively reduced, the water yield and water quality of pressure membrane product water are improved, the overall energy consumption of the membrane technology is saved, and the method has a great social effect on ensuring the water quality safety of drinking water and guaranteeing the health level of people; the forward osmosis technology has the advantages of low energy consumption, simple equipment, high water recovery and the like; and the forward osmosis has a good development prospect for improving the treatment efficiency of the nanofiltration process as an auxiliary process.

SUMMARY

In order to overcome the defects in the prior art, the present disclosure provides an online cleaning system for micro-polluted nanofiltration membranes using forward osmosis and a process of the online cleaning system so as to solve the problem of limitations of physical cleaning and chemical cleaning mentioned in the background issues, so that online high-efficiency nanofiltration membrane cleaning is achieved, and the system is low in energy consumption, capable of automatically operating and particularly beneficial to industrial popularization and application.

In order to achieve the above purpose, the present disclosure is achieved through the following technical scheme: an online cleaning system for micro-polluted nanofiltration membranes using forward osmosis comprises a nanofiltration raw water tank, a nanofiltration membrane assembly, a pure water tank, a forward osmosis feed solution tank, a forward osmosis draw solution tank, a first saline water tank, a second saline water tank and a water bath temperature control device, wherein a concentrated saline water outlet of the second saline water tank is pumped into the forward osmosis feed solution tank through a second peristaltic dosing pump and a pipeline; a feed solution in the forward osmosis feed solution tank sequentially passes through a forward osmosis system feed solution side conductometer, a forward osmosis system feed solution water inlet side one-way valve, a forward osmosis system feed solution water inlet main flowmeter, a forward osmosis system gear pump I, a forward osmosis feed solution side pressure gauge, the water bath temperature control device, an electromagnetic valve and a pipeline to enter the nanofiltration membrane assembly; fresh water in the nanofiltration membrane assembly passes through a nanofiltration system fresh water outflow electromagnetic valve, a nanofiltration system fresh water outflow flowmeter and a pipeline to enter the pure water tank; raw water in the nanofiltration raw water tank is sequentially connected with a nanofiltration system water inlet main electromagnetic valve, a nanofiltration system water inlet side one-way valve, a nanofiltration water inlet main flowmeter, a forward osmosis system gear pump II, a nanofiltration system raw water side pressure gauge, the water bath temperature control device and a pipeline through pipelines to enter the nanofiltration membrane assembly; according to the reading of a forward osmosis system draw solution side conductometer, concentrated saline water in the second saline water tank is pumped into the forward osmosis draw solution tank through a first peristaltic dosing pump so as to keep the concentration of a draw solution unchanged; the draw solution is sequentially connected with a forward osmosis system draw solution water inlet electromagnetic valve, the nanofiltration system water inlet side one-way valve, the nanofiltration water inlet main flowmeter, the forward osmosis system gear pump II, the nanofiltration system raw water side pressure gauge and the water bath temperature control device through pipelines to enter the nanofiltration membrane assembly; concentrated water in the nanofiltration membrane assembly is sequentially connected with a nanofiltration system concentrated water backflow flowmeter, a nanofiltration system backflow electromagnetic valve, a nanofiltration system concentrated water backflow side one-way valve and a nanofiltration system concentrated water backflow electromagnetic valve through pipelines to flow into the nanofiltration raw water tank.

The nanofiltration membrane assembly is respectively connected with a first forward osmosis system three-way valve, a second forward osmosis system three-way valve, a third forward osmosis system three-way valve and a fourth forward osmosis system three-way valve.

A second electronic balance is arranged at the bottom of the forward osmosis feed solution tank, and a first electronic balance is arranged at the bottom of the forward osmosis draw solution tank.

A process of the online cleaning system for micro-polluted nanofiltration membranes using forward osmosis comprises the following steps:

firstly, starting a nanofiltration membrane treatment system;

secondly, operating the nanofiltration membrane treatment system;

thirdly, starting a forward osmosis backwashing system: emptying the nanofiltration membrane assembly and water inlet and outlet pipes, closing the nanofiltration system water inlet main electromagnetic valve, a nanofiltration system concentrated water outflow electromagnetic valve, the nanofiltration system fresh water outflow electromagnetic valve and the nanofiltration system concentrated water backflow electromagnetic valve, injecting the draw solution into the forward osmosis draw solution tank, injecting deionized water into the forward osmosis feed solution tank, operating a "CLEAN" mode, automatically opening the first forward osmosis system three-way valve, the second forward osmosis system three-way valve, the third forward osmosis system three-way valve and the fourth forward osmosis system three-way valve (the specific meaning of opening the first forward osmosis three-way valve, the second forward osmosis system three-way valve, the third forward osmosis system three-way valve and the fourth forward osmosis system three-way valve is opening longitudinal outlets of the four three-way valves, namely opening side channels so that water flow does not pass through a main channel and a membrane pool) by the system, simultaneously opening the electromagnetic valve, a forward osmosis system raw water backflow electromagnetic valve, the forward osmosis system draw solution water inlet electromagnetic valve, the nanofiltration system backflow electromagnetic valve and a forward osmosis system draw solution side one-way valve, enabling feeding liquid to pass through the forward osmosis system feed solution side conductometer, the forward osmosis system feed solution water inlet side one-way valve, the forward osmosis system feed solution water inlet main flowmeter, the forward osmosis feed solution side pressure gauge and the water bath temperature control device for system rinsing, enabling the draw solution to pass through the forward osmosis system draw solution side conductometer, the nanofiltration system water inlet side one-way valve, the nanofiltration water inlet main flowmeter, the nanofiltration system raw water side pressure gauge and the water bath temperature control device to rinse a draw solution side pipeline, setting time, and automatically turning off the "CLEAN" mode;

fourthly, operating the forward osmosis backwashing system: switching the system to a "FLUSH" mode, injecting deionized water into the forward osmosis feed solution tank, injecting the draw solution into the forward osmosis draw solution tank, and injecting concentrated saline water into the first concentrated saline water tank; opening the forward osmosis system gear pump I and the forward osmosis system gear pump II, setting the pumping flow, setting the conductivity stable value of the draw solution, automatically closing the first forward osmosis system three-way valve, the second forward osmosis system three-way valve, the third forward osmosis system three-way valve and the fourth forward osmosis system three-way valve (the specific meaning of closing the first forward osmosis system three-way valve, the second forward osmosis system three-way valve, the third forward osmosis system three-way valve and the fourth forward osmosis system three-way valve is opening transverse outlets of the four three-way valves, namely opening a main channel so that water flow passes through a membrane pool without side channels) by the system, enabling the feed solution and the draw solution to enter the two sides of the nanofiltration membrane assembly respectively, simultaneously starting a dosing system, and recording and acquiring the permeation water flux and transmitting the permeation water flux to a computer by the first electronic balance; and fifthly, closing the forward osmosis backwashing system and starting the nanofiltration membrane treatment system: in the forward osmosis backwashing system, when the permeation water flux recorded by the computer reaches a preset value, switching the forward osmosis backwashing system to a "CLOSE" mode, closing the first peristaltic dosing pump, after water in the forward osmosis system is completely discharged, closing the forward osmosis system feed solution water inlet side one-way valve and the nanofiltration system water inlet side one-way valve, closing the forward osmosis system raw water backflow electromagnetic valve, the forward osmosis system draw solution side one-way valve, the forward osmosis system draw solution water inlet electromagnetic valve and the electromagnetic valve; automatically closing the first forward osmosis system three-way valve and the fourth forward osmosis system three-way valve by the system, entering a 'PREPRESS' mode, starting the next round of nanofiltration treatment process, and sequentially repeating the first step to the fifth step to achieve circulation.

The opening and closing of the peristaltic dosing pumps of the dosing system in the fourth step are jointly determined by the conductivity stable value of the draw solution and the reading of the forward osmosis system draw solution side conductometer; when the reading of the forward osmosis system draw solution side conductometer is lower than the conductivity stable value of the draw solution, the first peristaltic dosing pump automatically runs; and when the reading of the forward osmosis system draw solution side conductometer is higher than the value, the first peristaltic dosing pump is automatically closed.

The draw solution in the third step is a sodium chloride solution.

A scale inhibitor is added into the draw solution in the third step.

The scale inhibitor is polyaspartic acid.

Compared with the prior art, the present disclosure has the following beneficial effects.

Firstly, forward osmosis serves as a nanofiltration membrane cleaning system, and multiple cleaning modes such as backwashing, forward washing and surface cleaning of nanofiltration membranes can be rapidly achieved, so that the nanofiltration membrane cleaning efficiency is improved, the nanofiltration membrane flux recovery and the system water yield are increased, and meanwhile the energy consumption of the whole treatment system is effectively reduced without additional pressure.

Secondly, the process of cleaning micro-polluted nanofiltration membranes online using forward osmosis is high in automatic operation degree and simple and easy to operate; and the operation water yield is adjustable, the process is modularized, small in occupied area and capable of serving as basic equipment for construction of medium and small drinking water membrane treatment systems.

Thirdly, according to the process of cleaning micropolluted nanofiltration membranes online using forward osmosis, the environment-friendly scale inhibitor polyaspartic acid (PASP) is added into the draw solution of the forward osmosis backwashing system, so that the formation of scale on the surface of the nanofiltration membrane is reduced, the service life of the nanofiltration membrane is prolonged, and few influence is caused to the environment.

Fourthly, according to the process of cleaning micropolluted nanofiltration membranes online using forward osmosis, bidirectional cleaning of the micro-polluted nanofiltration membrane can be realized by adjusting the flow direction of the permeation fluid, so that the cleaning efficiency of the nanofiltration membrane is improved, and the service life of the membrane is prolonged.

Figure 1:
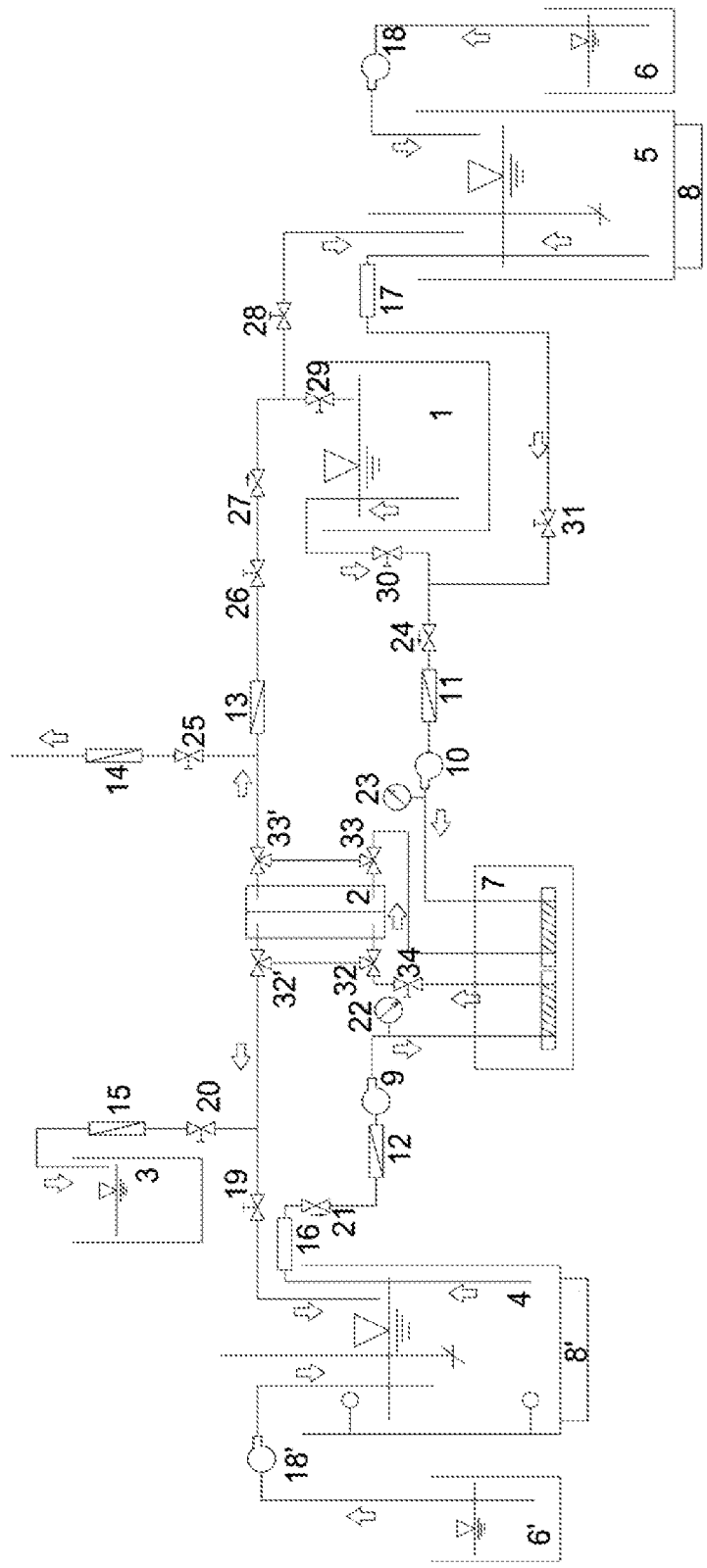
FIG. 1 is a set-up diagram of the system 100, according to an embodiment of the present invention.

REFERENCE SIGNS IN THE ATTACHED FIGURES 1, nanofiltration raw water tank; 2, nanofiltration membrane assembly; 3, pure water tank; 4, forward osmosis feed solution tank; 5, forward osmosis draw solution tank; 6, first concentrated saline water tank; 6', second concentrated saline water tank; 7, water bath temperature control device; 8, first electronic balance; 8', second electronic balance; 9, forward osmosis system gear pump I; 10, forward osmosis system gear pump II; 11, nanofiltration water inlet main flowmeter; 12, forward osmosis system feed solution water inlet main flowmeter; 13, nanofiltration system concentrated water backflow flowmeter; 14, nanofiltration system concentrated water outflow flowmeter; 15, nanofiltration system fresh water outflow flowmeter; 16, forward osmosis system feed solution side conductometer; 17, forward osmosis system draw solution side conductometer; 18, first peristaltic dosing pump; 18', second peristaltic dosing pump; 19, forward osmosis system raw water backflow electromagnetic valve; 20, nanofiltration system fresh water outflow electromagnetic valve; 21, forward osmosis system feed solution water inlet side one-way valve; 22, forward osmosis feed solution side pressure gauge; 23, nanofiltration system raw water side pressure gauge; 24, nanofiltration system water inlet side one-way valve; 25, nanofiltration system concentrated water outflow electromagnetic valve; 26, nanofiltration system backflow electromagnetic valve; 27, nanofiltration system concentrated water backflow side one-way valve; 28, forward osmosis system draw solution side one-way valve; 29, nanofiltration system concentrated water backflow electromagnetic valve; 30, nanofiltration system water inlet main electromagnetic valve; 31, forward osmosis system draw solution water inlet electromagnetic valve; 32, first forward osmosis system three-way valve; 32', second forward osmosis system three-way valve; 33, third forward osmosis system three-way valve; 33', fourth forward osmosis system three-way valve; and 34, electromagnetic valve.

DETAILED DESCRIPTION OF THE EMBODIMENTS

The present disclosure is further described in conjunction with the specific embodiments. It should be understood that the embodiments are merely used for illustrating the present disclosure without limiting the scope of the present disclosure. In addition, it should be understood that various changes or modifications of the present disclosure may occur to those skilled in the art after reading the contents in the present disclosure, and the equivalents also fall within the scope of the present disclosure.

Embodiment I

Firstly, NF-90 nanofiltration membrane is selected as a flat sheet membrane. The nanofiltration membrane assembly is assembled according to requirements. Two sets of full-automatic electric control equipment are adopted, and the pressure or flow of each pump and the operation parameters and time of subsystems are set through a touch type computer display screen. The system comprises a nanofiltration raw water tank 1, a nanofiltration membrane assembly 2 (NF membrane assembly 2), a pure water tank 3, a forward osmosis feed solution tank 4, a forward osmosis draw solution tank 5, a first saline water tank 6, a second saline water tank 6' and a water bath temperature control device 7, wherein a concentrated saline water outlet of the second saline water tank 6' is pumped into the forward osmosis feed solution tank 4 through a second peristaltic dosing pump 18' and a pipeline; a feed solution in the forward osmosis feed solution tank 4 sequentially passes through a forward osmosis system feed solution side conductometer 16, a forward osmosis system feed solution water inlet side one-way valve 21, a forward osmosis system feed solution water inlet main flowmeter 12, a forward osmosis system gear pump I 9, a forward osmosis feed solution side pressure gauge 22, the water bath temperature control device 7, an electromagnetic valve 34 and a pipeline to enter the nanofiltration membrane assembly 2; fresh water in the nanofiltration membrane assembly 2 passes through a nanofiltration system fresh water outflow electromagnetic valve 20, a nanofiltration system fresh water outflow flowmeter 15 and a pipeline to enter the pure water tank 3; raw water in the nanofiltration raw water tank 1 is sequentially connected with a nanofiltration system water inlet main electromagnetic valve 30, a nanofiltration system water inlet side one-way valve 24, a nanofiltration water inlet main flowmeter 11, a forward osmosis system gear pump II 10, a nanofiltration system raw water side pressure gauge 23, the water bath temperature control device 7 and a pipeline through pipelines to enter the nanofiltration membrane assembly 2; according to the reading of a forward osmosis system draw solution side conductometer 17, concentrated saline water in the second saline water tank 6 is pumped into the forward osmosis draw solution tank 5 through a first peristaltic dosing pump 18 so as to keep the concentration of a draw solution unchanged; the draw solution is sequentially connected with a forward osmosis system draw solution water inlet electromagnetic valve 31, the nanofiltration system water inlet side one-way valve 24, the nanofiltration water inlet main flowmeter 11, the forward osmosis system gear pump II 10, the nanofiltration system raw water side pressure gauge 23 and the water bath temperature control device 7 through pipelines to enter the nanofiltration membrane assembly 2; concentrated water in the nanofiltration membrane assembly 2 is sequentially connected with a nanofiltration system concentrated water backflow flowmeter 13, a nanofiltration system backflow electromagnetic valve 26, a nanofiltration system concentrated water backflow side one-way valve 27 and a nanofiltration system concentrated water backflow electromagnetic valve 29 through pipelines to flow into the nanofiltration raw water tank 1; the nanofiltration membrane assembly 2 is respectively connected with a first forward osmosis system three-way valve 32, a second forward osmosis system three-way valve 32', a third forward osmosis system three-way valve 33 and a fourth forward osmosis system three-way valve 33'; and a second electronic balance 8' is arranged at the bottom of the forward osmosis feed solution tank 4, and a first electronic balance 8 is arranged at the bottom of the forward osmosis draw solution tank 5.

The process comprises the following specific steps:

firstly, starting a nanofiltration membrane treatment system: installing a clean nanofiltration membrane on the NF membrane assembly 2 according to requirements, and assembling a connecting pipeline; injecting a proper amount of deionized water into the nanofiltration raw water tank 1, enabling the system to enter a "PREPRESS" mode, opening the nanofiltration system fresh water outflow electromagnetic valve 20, the nanofiltration system concentrated water outflow electromagnetic valve 25, the nanofiltration system backflow electromagnetic valve 26, the nanofiltration system concentrated water backflow electromagnetic valve 29, the nanofiltration system water inlet main electromagnetic valve 30 and the forward osmosis gear pump II 10 by the system, adjusting the rotating speed of the forward osmosis gear pump II 10, discharging about 1 L of concentrated water, and discharging fresh water through the nanofiltration system fresh water outflow flowmeter 15; after 1 L of concentrated water is discharged, enabling the concentrated water to flow back to the nanofiltration raw water tank 1; increasing the rotating speed of the forward osmosis gear pump II 10, adjusting the flowmeter 11 (taking the flow rate of 1000 mL/min as an example), adjusting the nanofiltration system raw water side pressure gauge 23 on a self-control panel, setting constant pressure (taking 500 kPa as an example), finely adjusting the flowmeter 11 after the flow rate is stabilized so that the flow rate of the flowmeter 11 is stabilized at 1000 mL/min, operating for 24 hours, and keeping constant temperature (taking 22° C. as an example);

secondly, operating the nanofiltration membrane treatment system: emptying water and outlet pipes of the NF membrane assembly 2, discharging fresh water into the pure water tank 3, changing raw water in the nanofiltration raw water tank 1, enabling the nanofiltration membrane system to enter a "RUN" mode, automatically opening the nanofiltration system water inlet main electromagnetic valve 30 by the system, maintaining the rotating speed of the forward osmosis gear pump II 10, opening the nanofiltration system concentrated water outflow electromagnetic valve 25, the nanofiltration system backflow electromagnetic valve 26 and the nanofiltration system concentrated water backflow electromagnetic valve 29, adjusting the nanofiltration system concentrated water backflow flowmeter 13 and the nanofiltration system concentrated water outflow flowmeter 14, controlling part of concentrated water to be discharged outwards and part of the concentrated water to flow back to the nanofiltration raw water tank 1, and discharging fresh water through the nanofiltration system fresh water outflow flowmeter 15; and enabling the nanofiltration membrane treatment system to operate for 8 hours, and when the treatment time is up, automatically closing the system to enter the next step;

thirdly, starting a forward osmosis backwashing system: emptying the NF membrane assembly 2 and water inlet and outlet pipes, closing the nanofiltration system fresh water outflow electromagnetic valve 20, the nanofiltration system concentrated water outflow electromagnetic valve 25, the nanofiltration system concentrated water backflow electromagnetic valve 29 and the nanofiltration system water inlet main electromagnetic valve 30, injecting the deionized water into the forward osmosis draw solution tank 5, injecting deionized water into the forward osmosis feed solution tank 4, operating a "CLEAN" mode, automatically opening the first forward osmosis system three-way valve 32, the second forward osmosis system three-way valve 32', the third forward osmosis system three-way valve 33 and the fourth forward osmosis system three-way valve 33' by the system, simultaneously opening the electromagnetic valve 34, a forward osmosis system raw water backflow electromagnetic valve 19, the forward osmosis system draw solution water inlet electromagnetic valve 31, the nanofiltration system backflow electromagnetic valve 26 and a forward osmosis system draw solution side one-way valve 28, enabling feeding liquid to pass through the forward osmosis system feed solution side conductometer 16, the forward osmosis system feed solution water inlet side one-way valve 21, the forward osmosis system feed solution water inlet main flowmeter 12, the forward osmosis feed solution side pressure gauge 22 and the water bath temperature control device 7 for system rinsing, enabling the draw solution to pass through the forward osmosis system draw solution side conductometer 17, the nanofiltration system water inlet side one-way valve 24, the nanofiltration water inlet main flowmeter 11, the nanofiltration system raw water side pressure gauge 23 and the water bath temperature control device 7 to rinse a draw solution side pipeline, setting time for 5 min, and automatically turning off the "CLEAN" mode;

fourthly, operating the forward osmosis backwashing system: switching the system to a "FLUSH" mode, injecting a proper amount of deionized water taking 2 L of deionized water as an example into the forward osmosis feed solution tank 4, injecting a proper amount of the draw solution taking 2 L of 1 mol/L sodium chloride solution as an example and adding 16 mg polyaspartic acid PASP as a scale inhibitor into the forward osmosis draw solution tank 5, and injecting a proper amount of concentrated saline water taking 1 L of saturated sodium chloride solution as an example into the first concentrated saline water tank 6; opening the forward osmosis system gear pump I 9 and the forward osmosis system gear pump II 10, setting the pumping flow taking 1500 mL/min as an example, setting the conductivity stable value of the draw solution, automatically closing the first forward osmosis system three-way valve 32, the second forward osmosis system three-way valve 32', the third forward osmosis system three-way valve 33 and the fourth forward osmosis system three-way valve 33' by the system, and enabling the feed solution and the draw solution to enter the two sides of the NF membrane assembly 2 respectively; simultaneously starting a dosing system, in which the opening and closing of the first peristaltic dosing pump 18 are jointly determined by the conductivity stable value of the draw solution and the reading of the forward osmosis system draw solution side conductometer 17 (when the reading of the forward osmosis system draw solution side conductometer 17 is lower than the conductivity stable value of the draw solution, the first peristaltic dosing pump 18 automatically runs; and when the reading of the forward osmosis system draw solution side conductometer 17 is higher than the value, the first peristaltic dosing pump 18 is automatically closed); recording and acquiring the permeation water flux and transmitting the permeation water flux to a computer by the first electronic balance 8; if forward flushing needs to be carried out, exchanging solutions in the forward osmosis feed solution tank 4 and the forward osmosis draw solution tank 5, simultaneously closing the first peristaltic dosing pump 18, starting the second peristaltic dosing pump 18'; closing the balance 8, and opening the balance 8', and other operations are the same as the original operations; and carrying out other operations the same as the original operations; and fifthly, closing the forward osmosis backwashing system and starting the nanofiltration membrane treatment system: in the forward osmosis backwashing system, when the permeation water flux recorded by the computer reaches a preset value, switching the forward osmosis backwashing system to a "CLOSE" mode, closing the first peristaltic dosing pump 18, after water in the forward osmosis system is completely discharged, closing the forward osmosis system feed solution water inlet side one-way valve 21 and the nanofiltration system water inlet side one-way valve 24, and closing the forward osmosis system raw water backflow electromagnetic valve 19, the forward osmosis system draw solution side one-way valve 28, the forward osmosis system draw solution water inlet electromagnetic valve 31 and the electromagnetic valve 34; automatically closing the first forward osmosis system three-way valve 32 and the fourth forward osmosis system three-way valve 33' by the system, entering a 'PREPRESS' mode, starting the next round of nanofiltration treatment process, and sequentially repeating the first step to the fifth step to achieve circulation.

According to the system, a Shimadzu total organic carbon tester (TOC-LCPH) is adopted to measure the total organic carbon TOC index of a water sample, a combustion catalytic oxidation method is adopted as a detection method, and the detection limit is 4 μg/L; the conductivity test adopts a Thermo water quality analyzer, and the relational expression between the conductivity test value and the total dissolved solid TDS is that TDS (mg/L)=0.518*conductivity value (μs/cm)−17.13. According to the inflow water quality, the total organic carbon TOC is 11.61 mg/L, and the total dissolved solid TDS is 1629 mg/L; and after the treatment of the system is completed, according to the effluent water quality, the total organic carbon TOC is 0.4 mg/L, the total dissolved solid TDS is 228 mg/L, and the effluent indexes reach the lower scope of the limiting value (TOC is smaller than 5 mg/L and TDS is smaller than 1000 mg/L) specified in "Sanitary Standards for Drinking Water" (GB5749-2022). Before reverse cleaning of the forward osmosis system, the TOC nanofiltration removal rate is 90%, and after cleaning, the TOC nanofiltration removal rate is increased to 96.5%. The flux of the nanofiltration membrane is 16.9 L/(m2·h) before cleaning and is increased to 19.0 L/(m2·h) after cleaning, and the flux of the nanofiltration membrane is increased by 12.4%. The water yield of the nanofiltration period is 100 L before cleaning and is increased to 110 L after cleaning, and the cleaning period is prolonged to 10 h from 4 h.

TABLE I inflow water quality and effluent water quality in Embodiment I

| Samples | Inflow Water Quality | | Effluent Water Quality | |
| --- | --- | --- | --- | --- |
| | TOC (mg/L) | TDS (mg/L) | TOC (mg/L) | TDS (mg/L) |
| 1 | 11.61 | 1606 | 0.3963 | 224 |
| 2 | 11.65 | 1668 | 0.3985 | 229 |
| 3 | 11.58 | 1613.5 | 0.3999 | 231 |
| Average Values | 11.61 | 1629 | 0.3982 | 228 |

Embodiment II

The system is the same as the embodiment, the difference between the treatment process and the first embodiment is that no scale inhibitor is added in the third step, the rest of the treatment process is the same as the first embodiment, and according to the effluent water quality after the treatment of the system is completed, the organic carbon TOC is 1.3 mg/L and total dissolved solid TDS is 342.3 mg/L.

TABLE II inflow water quality and effluent water quality in Embodiment II

| Samples | Inflow Water Quality | | Effluent Water Quality | |
|---|---|---|---|---|
| | TOC (mg/L) | TDS (mg/L) | TOC (mg/L) | TDS (mg/L) |
| 1 | 11.61 | 1606 | 1.296 | 341 |
| 2 | 11.65 | 1668 | 1.311 | 328 |
| 3 | 11.58 | 1613.5 | 1.278 | 358 |
| Average Values | 11.61 | 1629 | 1.295 | 342.3 |

The above description is merely illustrative of preferred embodiments of the present disclosure and of the principles of the employed technology. It should be understood by those skilled in the art that the scope of the present disclosure referred to in the present disclosure is not limited to technical schemes formed by specific combinations of the above technical features, but also covers other technical schemes formed by any combination of the above technical features or equivalents thereof without departing from the concept of the present disclosure. For example, the above features and those disclosed in the present disclosure (but not limited to) have similar functions.

What is claimed is:

1. An online cleaning system for micro-polluted nanofiltration membranes using forward osmosis, comprising a nanofiltration raw water tank (1), a nanofiltration membrane assembly (2), a pure water tank (3), a forward osmosis feed solution tank (4), a forward osmosis draw solution tank (5), a first saline water tank (6), a second saline water tank (6') and a water bath temperature control device (7), wherein a concentrated saline water outlet of the second saline water tank (6') is pumped into the forward osmosis feed solution tank (4) through a second peristaltic dosing pump (18') and a pipeline; a second electronic balance (8') is arranged at the bottom of the forward osmosis feed solution tank (4), a feed solution in the forward osmosis feed solution tank (4) sequentially passes through a forward osmosis system feed solution side conductometer (16), a forward osmosis system feed solution water inlet side one-way valve (21), a forward osmosis system feed solution water inlet main flowmeter (12), a forward osmosis system gear pump I (9), a forward osmosis feed solution side pressure gauge (22), the water bath temperature control device (7), an electromagnetic valve (34) and a pipeline to enter the nanofiltration membrane assembly (2); the nanofiltration membrane assembly (2) is respectively connected with a first forward osmosis system three-way valve (32), a second forward osmosis system three-way valve (32'), a third forward osmosis system three-way valve (33) and a fourth forward osmosis system three-way valve (33'); fresh water from the nanofiltration membrane assembly (2) passes through a nanofiltration system fresh water outflow electromagnetic valve (20), a nanofiltration system fresh water outflow flowmeter (15) and a pipeline to enter the pure water tank (3); raw water in the nanofiltration raw water tank (1) is sequentially connected with a nanofiltration system water inlet main electromagnetic valve (30), a nanofiltration system water inlet side one-way valve (24), a nanofiltration water inlet main flowmeter (11), a forward osmosis system gear pump II (10), a nanofiltration system raw water side pressure gauge (23), the water bath temperature control device (7) through pipelines to enter the nanofiltration membrane assembly (2); according to the reading of a forward osmosis system draw solution side conductometer (17), concentrated saline water in the first saline water tank (6) is pumped into the forward osmosis draw solution tank (5) through a first peristaltic dosing pump (18) so as to keep the concentration of a draw solution unchanged; the draw solution is sequentially connected with a forward osmosis system draw solution water inlet electromagnetic valve (31), the nanofiltration system water inlet side one-way valve (24), the nanofiltration water inlet main flowmeter (11), the forward osmosis system gear pump II (10), the nanofiltration system raw water side pressure gauge (23) and the water bath temperature control device (7) through pipelines to enter the nanofiltration membrane assembly (2); concentrated water in the nanofiltration membrane assembly (2) is sequentially connected with a nanofiltration system concentrated water backflow flowmeter (13), a nanofiltration system backflow electromagnetic valve (26), a nanofiltration system concentrated water backflow side one-way valve (27) and a nanofiltration system concentrated water backflow electromagnetic valve (29) through pipelines to flow into the nanofiltration raw water tank (1), and a first electronic balance (8) is arranged at the bottom of the forward osmosis draw solution tank (5).

2. An online cleaning process for micro-polluted nanofiltration membranes using forward osmosis using the system according to claim 1, comprising the following steps:
first, starting a nanofiltration membrane treatment system;
second, operating the nanofiltration membrane treatment system;
third, starting a forward osmosis backwashing system: emptying the nanofiltration membrane assembly (2) and water inlet and outlet pipes, closing the nanofiltration system water inlet main electromagnetic valve (30), a nanofiltration system concentrated water outflow electromagnetic valve (25), the nanofiltration system fresh water outflow electromagnetic valve (20) and the nanofiltration system concentrated water backflow electromagnetic valve (29), injecting the draw solution into the forward osmosis draw solution tank (5), injecting deionized water into the forward osmosis feed solution tank (4), operating a "CLEAN" mode, automatically opening the first forward osmosis system three-way valve (32), the second forward osmosis system three-way valve (32'), the third forward osmosis system three-way valve (33) and the fourth forward osmosis system three-way valve (33') by the system, simultaneously opening the electromagnetic valve (34), a forward osmosis system raw water backflow electromagnetic valve (19), a forward osmosis system draw solution water inlet electromagnetic valve (31), the nanofiltration system backflow electromagnetic valve (26) and a forward osmosis system draw solution side one-way valve (28), enabling feeding liquid to pass through the forward osmosis system feed solution side conductometer (16), the forward osmosis system feed solution water inlet side one-way valve (21), the forward osmosis system feed solution water inlet main flowmeter (12), the forward osmosis feed solution side pressure gauge (22) and the water bath temperature control device (7) for system rinsing, enabling the draw solution to pass through the forward osmosis system draw solution side conductometer (17), the nanofiltration system water inlet side one-way valve (24), the nanofiltration water inlet main flowmeter (11), the nanofiltration system raw water side pressure gauge (23) and the water bath temperature control device (7) to rinse a draw solution side pipeline, setting time, and automatically turning off the "CLEAN" mode;

fourth, operating the forward osmosis backwashing system: switching the system to a "FLUSH" mode, injecting deionized water into the forward osmosis feed solution tank (4), injecting the draw solution into the forward osmosis draw solution tank (5), and injecting concentrated saline water into the first concentrated saline water tank (6); opening the forward osmosis system gear pump I (9) and the forward osmosis system gear pump II (10), setting the pumping flow, setting the conductivity stable value of the draw solution, automatically closing the first forward osmosis system three-way valve (32), the second forward osmosis system three-way valve (32'), the third forward osmosis system three-way valve (33) and the fourth forward osmosis system three-way valve (33') by the system, enabling the feed solution and the draw solution to enter the two sides of the nanofiltration membrane assembly (2) respectively, simultaneously starting a dosing system, and recording and acquiring the permeation water flux and transmitting the permeation water flux to a computer by the first electronic balance (8); and fifth, closing the forward osmosis backwashing system and starting the nanofiltration membrane treatment system: in the forward osmosis backwashing system, when the permeation water flux recorded by the computer reaches a preset value, switching the forward osmosis backwashing system to a "CLOSE" mode, closing the first peristaltic dosing pump (18), after water in the forward osmosis system is completely discharged, closing the forward osmosis system feed solution water inlet side one-way valve (21) and the nanofiltration system water inlet side one-way valve (24), and closing the forward osmosis system raw water backflow electromagnetic valve (19), the forward osmosis system draw solution side one-way valve (28), the forward osmosis system draw solution water inlet electromagnetic valve (31) and the electromagnetic valve (34); automatically closing the first forward osmosis system three-way valve (32) and the fourth forward osmosis system three-way valve (33') by the system, entering a 'PREPRESS' mode, starting the next round of nanofiltration treatment process, and sequentially repeating the first step to the fifth step to achieve circulation.

3. The online cleaning process for micro-polluted nanofiltration membranes using forward osmosis according to claim 2, wherein the opening and closing of the peristaltic dosing pumps of the dosing system in the fourth step are jointly determined by the conductivity stable value of the draw solution and the reading of the forward osmosis system draw solution side conductometer (17); when the reading of the forward osmosis system draw solution side conductometer (17) is lower than the conductivity stable value of the draw solution, the first peristaltic dosing pump (18) automatically runs; and when the reading of the forward osmosis system draw solution side conductometer (17) is higher than the value, the first peristaltic dosing pump (18) is automatically closed.

4. The online cleaning process for micro-polluted nanofiltration membranes using forward osmosis according to claim 3, wherein a scale inhibitor is added into the draw solution in the third step.

5. The online cleaning process for micro-polluted nanofiltration membranes using forward osmosis according to claim 4, wherein the scale inhibitor is polyaspartic acid.

6. The online cleaning process for micro-polluted nanofiltration membranes using forward osmosis according to claim 2, wherein the draw solution in the third step comprises a sodium chloride solution.

7. The online cleaning process for micro-polluted nanofiltration membranes using forward osmosis according to claim 6, wherein a scale inhibitor is added into the draw solution in the third step.

8. The online cleaning process for micro-polluted nanofiltration membranes using forward osmosis according to claim 7, wherein the scale inhibitor is polyaspartic acid.

9. The online cleaning process for micro-polluted nanofiltration membranes using forward osmosis according to claim 2, wherein a scale inhibitor is added into the draw solution in the third step.

10. The online cleaning process for micro-polluted nanofiltration membranes using forward osmosis according to claim 9, wherein the scale inhibitor is polyaspartic acid.

* * * * *